United States Patent Office 2,937,929
Patented May 24, 1960

2,937,929

PURIFYING CRUDE SILICON

Walter Voos, Gampel, Switzerland, assignor to Lonza Electric and Chemical Works Limited, Basel, Switzerland, a corporation of Switzerland No Drawing. Filed Sept. 19, 1955, Ser. No. 535,294

Claims priority, application Switzerland Sept. 24, 1954

12 Claims. (Cl. 23—223.5)

This invention relates to a method of purifying crude silicon.

The crude silicon produced in the electric furnace usually contains approximately 97%, at most 98.5% silicon. The balance consists of various impurities which are mainly iron, aluminum, calcium, and minor amounts of magnesium and manganese. These impurities are present primarily in the form of their silicides.

A very pure grade of silicon, however, is required for various applications, for instance, for the production of silicon-copper alloys, silicon-aluminum alloys, and other special silicon-bearing alloys, further for acidproof linings for vats, apparatus, pipes, as well as for electronic devices.

It is known to purify comminuted crude silicon by means of acids. According to one known suggestion, crude silicon is treated in succession with muriatic acid, aqua regia, sulfuric acid, hydrofluoric acid, and again with muriatic acid, and in accordance with another suggestion, crude silicon is treated with hydrofluoric acid and water. All of the prior proposals use procedures which can only be performed in the laboratory. The methods known so far are not only unsuited for commercial scale uses but are at the same time dangerous. They cause substantial losses of silicon and are, therefore, uneconomical, and in addition, they are not applicable to purification of silicon on a larger scale since by the decomposition of the silicides hydrogen and self-igniting silicon hydride are formed and cause explosive reactions which may destroy the apparatus and cause injuries of operators.

Important objects of my invention center about a method of purifying crude silicon, which method will be suitable for large scale use and ensure good yields.

Another object of the present invention is to provide a method of purifying crude silicon, which will not be hazardous but will safely prevent the occurrence of explosions.

Still another object of the invention is to purify crude silicon to obtain a material of the highest possible purity. My process yields essentially pure silicon of a purity of at least 99.5 to 99.9%. Even a purity of 99.99% can be produced economically on a large commercial scale.

Further objects of my invention will appear from the following description.

The process of the invention starts from finely divided crude silicon and provides that the silicon be first subjected to a treatment with water and then to a treatment with an acid or with acids. In the acid treatment, a maximum quantity of the finely divided crude silicon is not exceeded, the maximum quantity being determined in relation to the volume used of the leaching acid.

My method is based on the discovery that the purification of crude silicon must be performed in two separate successive and hereinafter in detail described stages if explosive reactions are to be avoided.

First, the magnesium silicide contained in the crude metal is decomposed by the water treatment. The finely divided crude metal, after its treatment with water, is subjected to the acid treatment, whereby, as has been indicated, the quantity of the metal is limited by the volume of the acid liquor. The acid leaching is first done at room temperature with a gradually increasing, and then with a decreasing concentration of the acid. After this, the temperature is gradually raised and maintained at the level reached.

In performing the method of my invention, it is necessary first to reduce the crude silicon, as it comes from the electric furnace, to a finely divided form. This may conveniently be done by comminution in a roller mill or edge runner. I have found it most effective to continue comminution until the finely divided material will pass a sieve of 0.075 mm. mesh opening and 6,400 mesh per square contimeter (German Standard DIN 80).

The water treatment may be performed at room temperature. I prefer, however, to use water heated to 50 to 80° C., and preferably to 60 to 65° C. This operation serves a double purpose. In the first place, the magnesium silicide, $Mg_2Si$, which is present in the crude silicon and tends to explode in the presence of an acid is decomposed by water. This causes a violent development of hydrogen which, however, is harmless since no self-igniting silicon hydride is formed. In the second place, any dirt adhering to the silicon is removed by this pretreatment. The water treatment may be considered complete as soon as the development of hydrogen ceases or becomes very faint.

The acid treatment must be performed in a precise manner. I found by exhaustive experimentation that the finely divided crude silicon pretreated with water must not be treated with high concentrations of an old but still active acid solution nor with a concentrated acid because such treatment leads to explosive reactions. Instead, the acid treatment must be started with gradually increased acid concentrations. The temperature has to be held low at first and may be increased only at higher acid concentrations and very gradually. Very thorough experiments were carried out to determine the relative amounts of finely divided crude silicon and acid solution. I found that a series of explosions in quick succession will occur if crude silicon powder pretreated with water, in amounts of more than 80 grams per liter of acid, is treated at room temperature with acid solutions of a even weak hydrochloric acid content. Explosions can safely be avoided only with amounts of less than 80 g. of the metal powder per liter of acid liquor, and preferably with only 60 g./l. Even with such a low ratio of metal powder to acid solution, care must be exercised to start the treatment at low temperatures since even when working at low acid concentrations and with small amounts of silicon, explosions occur by applying immediately higher temperatures.

The acids of choice for the commercial application of my method are first hydrochloric acid and then in second range sulfuric acid. Hydrofluoric acid may also be used but should be avoided for reasons of economy as long as another acid, for example, hydrochloric acid, is still capable of dissolving the principal impurities. Hydrofluoric acid is, therefore, not used for prepurification purposes but only resorted to, mainly as a companion acid, when higher degrees of purity are to be achieved. In said mixture of hydrochloride acid and hydrofluoric acid the concentration of hydrochloric acid must be held so high as to repress the solubility of the silicon in the mixture of acids. All other acids or chlor-derivates are less suitable either for reasons of apparatus, or because of their low effectiveness and, hence, an excessive leaching period. While investigating the effectiveness of various acids, I found that hydrochloric acid with an increasing concentration works more effectively than sulfuric acid, aqua regia, or nitric acid. The use of aqua regia or nitric acid, together with hydrochloric or sulfuric acid, would only make the apparatus more costly without achieving any effect beyond that achieved with hydrochloric acid. Thus, for the purposes of my invention, hydrochloric acid is preferred as the most important leaching acid. Its concentration may be increased to 300 g./l. HCl.

The following examples serve to illustrate this invention, without limiting, however, the scope thereof.

EXAMPLE 1

Crude silicon coming from the electric furnace was comminuted in a roller mill or in an edge runner until it passed through a sieve of the German Standard DIN 80. The finely divided crude metal was then essentially freed from its magnesium silicide by treatment with water of approximately 60 to 65° C. A batch of 240 kg. of the pretreated silicon powder was transferred to a vat of 5 cubic meter capacity. The vat was equipped with an agitator and baffles at its interior wall, and contained 3,840 liters of water (tap water). Leaching was done with a solution, the acid concentration of which was gradually built up. The hydrochloric acid used had a specific gravity of 1.1735 and contained 400 g./l. HCl.

I have found it most effective to start with an acid liquor, the hydrogen chloride content of which was gradually increased from 0 g./l. to approximately 16 g./l. HCl at room temperature, and then to increase the acid concentration while gradually raising the temperature.

In order to eliminate the possibility of explosions, the acid concentration is preferably built up in the following manner:

With vigorous agitation, the following amounts of hydrochloric acid of specific gravity 1.1735 are added at room temperature and at the times indicated to 3,840 l. tap water and to 240 kg. crude silicon powder pretreated with water:

5 liters HCl, then wait 30 min. after addition, then pour on
5 liters HCl, then wait 30 min. after addition, then pour on
5 liters HCl, then wait 20 min. after addition, then pour on
10 liters HCl, then wait 15 min. after addition, then pour on
15 liters HCl, then wait 10 min. after addition, then pour on
20 liters HCl, then wait 5 min. after addition, then pour on
20 liters HCl, then wait 5 min. after addition, then pour on
20 liters HCl, then wait 5 min. after addition Within 120 minutes 100 liters of hydrochloric acid were added.

Leaching was continued for an additional hour at the same concentration and at room temperature. After a total leaching time of 3 hours, 60 l. more of hydrochloric acid were added so that the vat contained 4,000 l. of liquor. During the next 5 hours, at an acid concentration of 16 g./l. HCl, the temperature was increased to approximately 30 to 35° C. After the first 8 hours of leaching, a still existing acid concentration of 14 g./l. HCl was measured. After this treatment of 8 hours, the leached material was no longer very sensitive and could be treated further without trouble at higher acid concentration and at a higher temperature. For this purpose, the acid concentration was increased to 100 g./l. HCl by addition of hydrochloric acid, and the temperature was increased during four hours to 40 to 45° C., and during the subsequent 4 hours to 75 to 80° C. After the last leaching time of 8 hours, the acid concentration had dropped from 100 to about 92 g./l. HCl.

The solid material was then separated from the acid liquor, and leaching was continued at an elevated temperature in 4,000 liters of a liquor containing 200 g./l. HCl. During the 17th to 20th hour, the temperature was 80 to 85° C., and during the 21st to 24th hour 90 to 95° C. Whereas at the beginning of the 17th hour of leaching, the acid concentration was at 200 g./l. HCl, it dropped at the end of the 24th hour to approximately 157 g./l. HCl. After 8 more hours of leaching at 90 to 95° C., the liquor contained only about 137 g./l. HCl, and after an additional 8 hour leaching at 90 to 95° C., that is after a total leaching time of 40 hours, only 125 g./l. of free acid were present in the liquor. This liquor is after addition of new acid ready for further extractions.

The solid material was again separated from the liquor, and leached during the last 8 hours at 90 to 95° C. with the liquor, which has been separated from the liquor obtained at the end of the 16th hour. This liquor which contained only 92 g./l. HCl was before employing it regenerated, by addition of hydrochloric acid, to a content of 100 g./l. HCl. At the end of the last 8 hour leaching period, the free acid content had again dropped to about 92 g./l.

When the crude silicon powder had an iron content which did not exceed 0.5 to 0.6% materially, leaching with hydrochloric acid of various concentrations, as described in this example, yielded silicon with a degree of purity of 99.5%, and a calcium and aluminum content of 0.09% each maximum.

When the crude silicon powder had an iron content between 0.7 and 1.5%, then simple leaching with hydrochloric acid, for example, was not adequate to obtain a product with such a high silicon content. Additional combined leaching was necessary.

So far, I have described the feature of the invention, according to which by water treatment and an acid treatment of approximately 48 hours with hydrochloric or sulfuric acid such companion metals of silicon are removed as are removable with the aid of these acids, that is, magnesium, iron, aluminum, calcium, and manganese. After approximately 48 hours of leaching, further appreciable progress cannot be achieved by leaching with hydrochloric acid. To purify silicon further, iron is to be removed, aside from minute amounts of aluminum, calcium, and manganese. Depending on the raw material, the product of leaching, after leaching with hydrochloric acid, still contains 0.12 to 0.5% iron. With 1 to 1.5% iron in the crude silicon, up to 0.66% iron remain in the silicon metal after leaching with hydrochloric acid. The iron is present in the form of iron silicide which cannot be leached out with hydrochloric acid, that is, poorly soluble modifications of iron silicide, such as $FeSi_2$. The higher the iron content is in the silicon, the higher is the proportion of silicides which cannot be leached out with hydrochloric acid. Therefore, it is useless and uneconomical to extend leaching with hydrochloric acid beyond 48 hours. Similar observations hold true for sulfuric acid.

Long series of experiments carried out with various acid concentrations and various acid mixtures, at all practical temperatures, have shown that the silicon metal grain will release the slightly soluble modifications of iron silicide only if the leaching is done with a mixture of, e.g. hydrochloric and hydrofluoric acid.

I have found that the poorly soluble iron silicide modifications can effectively and economically be decomposed by a combined leaching with hydrochloric and hydrofluoric acid when a relatively high concentration of hydrogen chloride and a relatively low concentration of hydogen fluoride is used. For the mixed acid leaching with hydrofluoric acid, it is essential that the solubility of silicon be held low by a relatively high proportion of hydrochloric acid and a relatively limited proportion of hydrofluoric acid so that only minor losses of purified silicon will be suffered. Good results were achieved when the concentration of hydrogen chloride amounted to 200 g./l., and the concentration of hydrogen fluoride up to 20, preferably 6 g./l.

Since with the leaching with mixed acids and the decomposition of iron silicides, foaming occurs, it is advisable to prevent overflowing of the foam over the rim of the reaction vessel by starting the leaching with mixed acids at room temperature, and increasing the temperature only later. An increase of the temperature beyond 90 to 95° C. is not recommended. Working at boiling temperature would only lead to unnecessary excessive losses of hydrogen chloride and of the expensive hydrogen fluoride. A leaching temperature of 90 to 95° C. involves a tolerable maximum of hydrogen fluoride losses. In 8 hours, the loss amounts to approximately 2 up to a maximum of 4 g./l., which includes not only the consumption for the decomposition of the iron silicide, but also the loss by vaporisation.

Mixed acid leaching may be carried out with hydrofluoric acid together with hydrochloric acid or any other mineral acid, such as sulfuric acid. The following example deals with a mixed acid leaching with hydrochloric and hydrofluoric acid.

EXAMPLE 2

240 kg. of a silicon powder purified according to Example 1 were treated with a mixture of hydrochloric and hydrofluoric acid, containing 200 g./l. HCl and 6 g./l. HF. 4,000 liters of the mixture were prepared from 1,920 l. water, 2000 l. hydrochloric acid (sp. gr. 1.1735) containing 400 g./l. HCl, and 80 l. hydrofluoric acid containing 300 g./l. HF. Leaching of the silicon powder with the mixed acids was done, while agitating as shown in the following table:

3 hours at room temperature
2 hours at 35–40° C.
1 hour at 60–65° C.
2 hours at 90–95° C.

Depending on the amount of iron present and the degree of purification desired, the leaching with the mixed acids may be extended beyond the first eight hours of leaching time. For further leaching, the concentration is preferably adjusted every eight hours to 200 g./l. HCl and 6 g./l. HF, respectively. Due to the gradual increase in temperature, the silicon particles become insensitive. After 90 to 95° C. is reached, the temperature may be maintained without any danger of over-boiling of the foam formed or still being formed by decomposition of iron silicide.

The leaching with mixed acids results in a substantial additional purification of the silicon. It is not only the iron content that is appreciably reduced, there is a further removal of aluminum, calcium, and manganese, as indicated by the figures tabulated below.

To refine the silicon purified by the treatment with one mineral acid and then mixed acids still further, a leaching in paste form and in heaps may follow. Such leaching is dealt with in Example 3.

EXAMPLE 3

About 240 kg. of a silicon powder purified according to Examples 1 and 2 were subjected to leaching in heaps. The silicon powder was treated with a liquor consisting of hydrochloric and hydrofluoric acid. While the concentration of the hydrochloric acid was held within the order of magnitude, indicated in Example 2, the concentration of the hydrofluoric acid was substantially increased. A suitable liquor contained, for example, 200 g./l. HCl and up to 300 g./l. HF. This mixed acid was used in a volume ratio of 10 to 20% of the metal powder treated. A paste was formed of approximately 24 to 48 liters of the mixed acid and of 240 kg. of the purified silicon powder. The heap of paste is left to stand for some time, for example, 3 to 4 days, without any stirring. Samples are drawn from time to time to determine the degree of purity reached. If an analysis of the sample shows that the silicon powder does not yet present the desired degree of purification, the leaching of the paste in heaps is repeated until a satisfactory result is achieved. The use of a high concentration of hydrochloric acid is necessary to advance the purification and to limit at the same time silicon losses.

The supriority of the process of the invention is illustrated by the analysis results tabulated below:

| Material analyzed | Percent Fe | Percent Al | Percent Ca | Percent Mn |
|---|---|---|---|---|
| Raw material (crude Si metal) | 1.00 | 0.28 | 0.91 | 0.026 |
| After leaching according to Examples 1 and 2 | 0.0040 | 0.0068 | 0.013 | 0.00031 |
| After leaching in heaps according to Example 3 | 0.0024 | 0.0042 | 0.0038 | 0.00020 |
| Leaching according to the two prior methods referred to in this specification | 0.019 | 0.02 | 0.009 | |
| Do | 0.02 | 0.016 | 0.005 | |

From the foregoing description it will be seen that the entire wet-metallurgical treatment according to my invention comprises the following steps:

(1) Pretreatment with water to decompose magnesium silicide;
(2) Leaching with hydrochloric or sulfuric acid at gradually increasing acid concentration and at gradually increasing temperature;
(3) Mixed acid leaching with hydrofluoric and hydrochloric or sulfuric acid; and
(4) Leaching in paste form in heaps with hydrochloric or sulfuric and hydrofluoric acid.

While the wet-metallurgical treatment of steps 1 and 2 must always be performed in the order listed, the leaching steps 3 and 4 may be omitted if a very high purity is not required. Depending on the requirements for purity, it is also possible to carry out only one of steps 3 and 4, or to reverse the sequence.

It is further possible to reduce the leaching period which according to Example 1 (step 2) should generally take 48 hours by continuing the leaching with hydrochloric acid alone until the critical period during which explosions may occur is passed. In this case, the leaching capacity of the acid, for example, hydrochloric acid, is not fully utilized. When a reduced period of leaching with hydrochloric or sulfuric acid is to be applied, I prefer to interrupt the leaching after no more than 24 hours and to follow with a mixed acid leaching with hydrofluoric and hydrochloric or sulfuric acid according to Examples 2 or 3 either with or without agitation.

The leaching is usually performed in open vats, but the extraction may be accelerated by treatment in an autoclave as soon as the critical leaching period during which explosions are started has been passed. The autoclave is used for those steps in which the danger of explosion no longer exists.

Upon completion of the leaching, the material is carefully washed with warm water of a temperature, for instance, of 60–65° C., and then dried.

If a material of even greater purity is aimed at, I prefer to follow then with a heat treatment in order to remove the carbon present in the crude metal. This treatment consists in a decarburization in the absence of air with the aid of substances, such as iron oxides, which substances are added to combine with the carbon.

The decarburization of the crude silicon powder is performed prior to the wet treatment by adding, for example, $Fe_3O_4$, magnetite, in excess over the carbon present in the crude silicon powder, heating the mixture in the absence of air to 900 to 930° C., and then cooling also in the absence of air. The metallic iron and the portion of magnetite, which was not reduced, are then extracted by HCl, together with the soluble secondary fractions of Ca, Al, and Mn, contained in the crude silicon.

Degassing of the crude silicon to remove gasses, such as hydrogen, oxygen, nitrogen, is done in any known way. The phosphorus present in the starting material is extracted step by step proportionally to the removal of the iron.

The purified silicon metal powder is dried at 75 to 80° C. in a non-oxidizing atmosphere. Forming of the silicon powder may likewise be done in any known manner.

It is believed that the method of my invention, as well as the many advantages thereof, will be fully understood from the foregoing description. It will be seen that with the stepwise treatment here disclosed, a wet-metallurgical method has been provided that makes it possible to purify the various grades of crude silicon, as they are obtained by fusion in the electric furnace, the method being fully adjustable to the degree of contamination and the final purity desired. It is the stepwise procedure that prevents explosions and accidents associated with explosions, and yields a silicon of a degree of purity of at least 99.5% with a low calcium and aluminum content of 0.09% each maximum, or a metal of 99.9% or even 99.99% silicon content.

The following flow sheet indicates the individual steps of my method. The procedures of steps 3, 6 and 7 may optionally be carried out if especially pure silicon is to be obtained, As has already been indicated, the sequence of steps 6 and 7 may be reversed.

*Flow sheet*

(1) Crude silicon metal
↓
(2) Pulverizing
↓
(3) (Decarburizing and degassing, optional)
↓
(4) Pretreatment with water
↓
(5) Treatment with acid
↓
(6) (Mixed acid leaching with hydrochloric and hydrofluoric acid, optional)
↓
(7) Leaching in paste form in heaps, optional)
↓
(8) Washing and drying
↓
(9) Pure silicon It will be apparent that while I have shown and described my invention in different forms, many changes may be made without departing from the spirit of the invention defined in the following claims.

I claim:

1. Method of purifying crude silicon, comprising dividing the crude silicon to such a fine degree that it will pass a sieve of 0.075 mm. mesh opening and 6,400 mesh per sq. cm., treating the finely divided silicon with water of approximately 50° to 80° C. until the magnesium silicide contained in the crude silicon is at least substatnially decomposed, intermittently adding to the silicon thus pretreated an acid selected from the group consisting of hydrochloric, sulfuric acid, and mixtures thereof, using for said acid treatment 1 liter of the acid liquor per approximately 80 grams of crude silicon at the most, starting the acid treatment at room temperature, increasing the starting temperature up to approximately 90° to 95° C. during the acid treatment, increasing the acid concentration during the acid treatment, by said intermittent additions of the acid, up to 300 g./1. HCl and corresponding values, washing the purified silicon, and drying same.

2. The method according to claim 1, wherein the treatment with water is carried out at temperatures between approximately 60 and 65° C.

3. The method according to claim 1, wherein approximately 60 grams of the crude silicon are used per liter of acid liquor.

4. In the method according to claim 1, using hydrochloric acid as said acid, increasing the HCl-concentration, at room temperature, within approximately two hours from 0 g./1. HCl to approximately 16 g./1. HCl, and continuing the leaching, upon reaching the concentration of approximately 16 g./1. HCl, for approximately one hour at room temperature before increasing the temperature and further increasing the HCl-concentration.

5. In the method according to claim 1, using hydrochloric acid as said acid, increasing the HCl-concentration, at room temperature, within approximately two hours from 0 g./1. HCl to approximately 16 g./1. HCl, and continuing the leaching while stepwise increasing the HCl-concentration to approximately 200 to 300 g./1. HCl and the temperature to approximately 95° C.

6. The method according to claim 1, wherein the purified silicon is subjected to a subsequent leaching, the subsequent leaching is performed with a mixture containing hydrofluoric acid and an acid selected from the group consisting of hydrochloric acid, sulfuric acid, and mixtures of the last two named acids, the concentration of the acid selected from said group is held, calculated on the basis of hydrochloric acid, at approximately 200 g./1. HCl so as to repress the solubility of the silicon in the mixture, the hydrofluoric acid is used in a concentration of approximately 6 to 20 g./1., and the treatmetn with the mixture is carried out first at room temperaure and then at temperatures increasing up to approximately 90° to 95° C.

7. The method according to claim 1, wherein the purified silicon is formed together with a mixture of acids into a paste, the mixture containing hydrofluoric acid and an acid selected from the group consisting of hydrochloric acid, sulfuric acid, and mixtures of the last two named acids, approximately 10 to 20% by volume of the first named mixture relative to the silicon are used for the paste-formation, and the paste is subjected to heap-leaching by allowing the paste to stand in heaps.

8. The method according to claim 7, wherein as said mixture hydrochloric acid in a concentration of approximately 200 g./1. HCl, and hydrofluoric acid in a concentration of approximately up to 300 g./1. HF, are used.

9. The method according to claim 7, wherein the leaching in heaps is periodically repeated.

10. The method according to claim 6, wherein the treatment with the mixture of acids is followed by a treatment of the silicon in paste form and in heaps, the treatment of the silicon in paste form and in heaps being carried out by means of a mixture containing an amount of 10 to 20% by volume of hydrofluoric acid and another mineral acid, relative to the weight of the silicon.

11. In the method according to claim 1, decarburizing the finely divided crude silicon, prior to its wet-metallurgical treatment, by heating with substances capable of retaining carbon.

12. In the method according to claim 1, degassing the crude silicon.

References Cited in the file of this patent

UNITED STATES PATENTS

| 1,019,431 | Dempster | Mar. 5, 1912 |
| 1,386,227 | Becket | Aug. 2, 1921 |
| 1,928,728 | Keyes | Oct. 3, 1933 |
| 2,402,839 | Ohl | June 25, 1946 |
| 2,469,418 | Striplin | May 10, 1949 |

FOREIGN PATENTS

Hackh's Chemical Dictionary, 3rd edition (1944) page 505, The Blakiston Company.

Mellor "Comprehensive Treatise on Inorganic and Theoretical Chemistry," vol. 6, 1925, pp. 162 and 169.